April 23, 1968     L. E. HOLLAND     3,379,475

TAILGATE CONTROL DEVICE

Filed Nov. 26, 1965

INVENTOR
LEONARD E. HOLLAND
BY Dick, Zarley, McKee & Thomte
ATTORNEYS

United States Patent Office 3,379,475
Patented Apr. 23, 1968

3,379,475
TAILGATE CONTROL DEVICE
Leonard E. Holland, 1907 5th Ave. S.,
Fort Dodge, Iowa 50501
Filed Nov. 26, 1965, Ser. No. 509,701
1 Claim. (Cl. 298—23)

ABSTRACT OF THE DISCLOSURE

A vehicle having a frame, a box pivotally connected at one end to the rear end of the frame, a door pivoted to the rear end of the box and extending downwardly from the pivotal axis, means for pivotally raising and lowering the box, a shaft extending transversely of the rear end of the box and having hook elements secured thereto for releasably engaging laterally outwardly extending pins carried on the lower end of said door, a lever arm extending downwardly from the shaft and connected to a forwardly extending rod which is pivotally connected to an arm extending upwardly and connected to a rotatable sleeve, said sleeve having a second arm extending rearwardly of said frame for engagement with an abutment member when said box is in its lowered position, a spring means for normally biasing said second arm towards engagement with said abutment member and said latch means out of engagement with said door, and said hook elements being disengaged from said pins on said door upon raising said box and adapted to engage said pins upon lowering said box.

---

Present day conventional dump trucks include manual means for opening and closing the tailgate of a dump truck when it is desired to unload the truck box. Operation of the manual control means may mean leaving the cab of the truck. Some tailgate closure devices also have the problem of accidentally swinging closed as the truck moves across rough terrain.

Accordingly, it is one of the objects of this invention to provide a tailgate control device which is responsive to the raising and lowering of a truck box.

Another object of this invention is to provide a tailgate closing device which is adapted to be positively locked in a closed position when the truck box is lowered.

Another object of this invention is to provide a tailgate closing device wherein the tailgate cannot accidentally swing to a locked closed position as the truck moves along unloading its contents.

A still further object of this invention is to provide a tailgate closing device which is normally biased to an open position and only upon lowering the truck box is the tailgate control device actuated to its closed position.

A further object of this invention is to provide a tailgate control device which is simple in design, economical to manufacture and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claim, and illustrated in the accompanying drawings in which:

Figure 1:
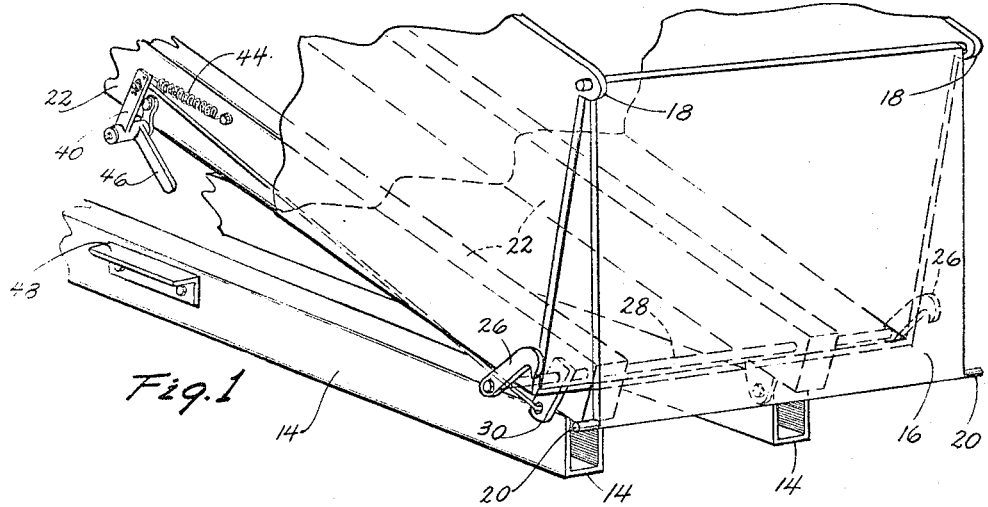
FIG. 1 is a fragmentary perspective view of a box mounted on a vehicle frame in a raised position with the tailgate in an open position and in particular showing the relative position of the tailgate control device.
Figure 4:
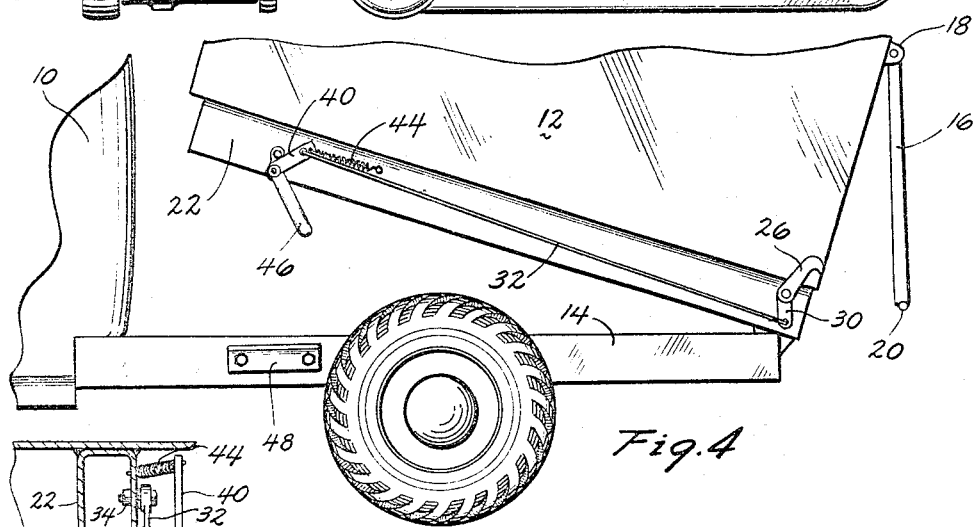
FIG. 4 is a side elevation view of a dump truck with the control device mounted thereon wherein the tailgate is in its open position.

In FIG. 4 a vehicle 10 is shown having a box 12 mounted on a vehicle frame 14. The box 12 is pivotally connected to the frame 14 at the rear end of the box and the frame which includes a pair of channel members as seen in FIG. 1. A tailgate 16 is pivotally mounted to a pair of ears 18 on the upper rear end corners of the box 12. Thus, the tailgate 16 extends downwardly and is adapted to swing frontwardly and rearwardly along the longitudinal axis of the truck 10. In the tailgate's closed position, it would cover the open rear end of the box 12. Along the lower edge of the tailgate 16, a pair of pins 20 are provided for engagement with a latch means which is hereinafter described in greater detail.

The box 12 includes a pair of frame members 22 which are adapted to matingly engage and rest upon the vehicle frame members 14 when the box is in its lowered position.

Figures 2, 3:
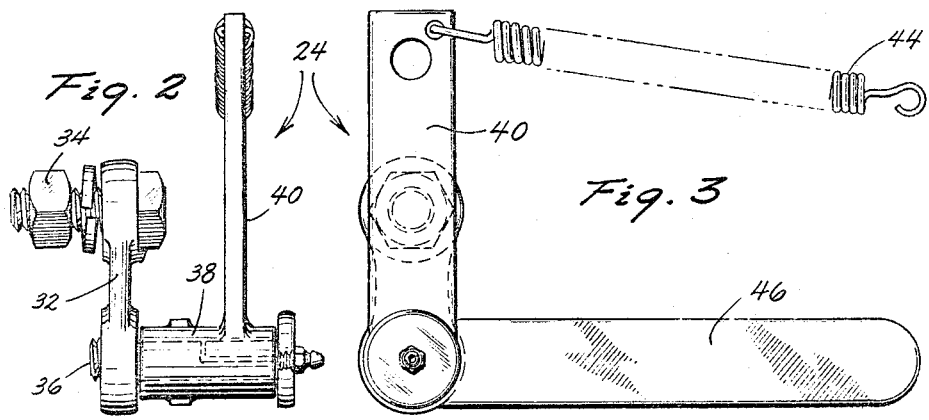
FIG. 2 is a front end elevation view of the control device.
FIG. 3 is a side elevation view of the control device as seen from the right side of FIG. 2.
Figure 5:
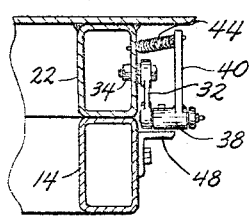
FIG. 5 is a cross-sectional view similar to FIG. 2 but showing the control device as it would appear mounted on the truck when the box is in its lowered position.

The tailgate control device is generally referred to in FIGS. 2 and 3 by the reference numeral 24. A pair of hook-type latch members 26 are mounted on a shaft 28 which extends transversely through the box frame members 22. The hook latch members 26 are mounted to releasably engage the pin members 20 on the tailgate door 16. As seen in FIG. 1, a downwardly extending plate member 30 is rigidly connected to the shaft 28 and is connected by an actuating rod 32 which extends forwardly along the box frame member 22 to a point near the front end of the box 12. The control device includes a pivotal member and serves as a coordinating assembly for operation of the actuating rod 32 and is mounted on the side of the box frame member 22 as seen in FIGS. 1, 4 and 5. A mounting bracket 32 is fixedly secured to the box frame 22 by a bolt assembly 34. A shaft 36 extends from the lower end of the bracket 32 and has a sleeve 38 rotatably mounted thereon. A first arm 40 extends generally upwardly along the box frame member 22 where it is engaged by the forward free end of the actuating rod 32. A spring 44 also connects to the upper end of the arm 40 and extends toward the rear of the box where it is connected to the box frame member 22. A second arm 46 extends downwardly from the sleeve 38 towards the vehicle frame 14. An abutment plate 48 is secured to the side of the vehicle frame member 14 in the vertical plane of the second arm 46. Thus, when the box 12 is lowered the arm 46 will frictionally engage the abutment plate 48 and pivot the arm upwardly.

Thus in operation, the truck box would normally be loaded with material and then raised to a position similar to that of FIGS. 1 or 4. Upon raising the box 12 the pressure of the material in the box would push the tailgate 16 outwardly to its position of FIGS. 1 and 4, whereby the pins 20 on the tailgate 16 would move out of engagement with the latch members 26. The upward pivotal movement of the latch members 26 would be assisted by the spring 44. After the box 12 is unloaded and is returned to its horizontal lowered position, the arm 46 would come into engagement with the abutment plate 48 and begin pivoting the arm 40 in a counter-clock-wise direction as seen in FIG. 4, thus pulling the actuating rod 32 forwardly and pivoting the latch members 26 downwardly over the pin members 20 on the tailgate 16. When the box 12 is lowered the tailgate 16 which normally hangs in a vertical plane would then be in a closed position abutting against the open rear end of the box 12 and consequently the pins 20 would be in a position to be engaged by the latch members 26 as they are pivoted downwardly.

Thus it is seen that opening and closing of the tailgate 16 may be completely automatic as it is responsive to the raising and lowering of the truck box 12. As the box 12 is pivoted upwardly the tailgate is automatically opened and as the box is pivoted downwardly, the tailgate is automatically locked in a closed position. It is to be appreciated that as the truck moves over a rough road or the like the tailgate 16 will swing back and forth but will not be locked closed until the truck box 12 is lowered since the spring 44 is holding the latches 26 in their raised positions.

Some changes may be made in the construction and arrangement of my tailgate control device without departing from the real spirit and purpose of my intentions, and it is my intention to cover by my claim, and modified forms of structure or use of mechanical equivalents which may be reasonably included within their scope.

I claim:
1. In combination,
   a vehicle having a frame, a box pivotally connected at one end to the rear end of said vehicle frame, a door pivoted to the rear end of said box and extending downwardly from the pivotal axis,
   means for pivotally raising and lowering said box,
   latch means for releasably engaging and locking said door in a closed position,
   actuating means operatively connected to said latch means and adapted to move said latch means into and out of engagement with said door,
   coordinating means connected to said actuating means for making said latch means responsive to the raising and lowering of said box said latch means being disengaged from said door upon raising said box and adapted to engage said door upon lowering said box,
   said latch means including a shaft rotatably mounted on said truck extending the width thereof adjacent said door, a downwardly extending lever arm rigidly secured to said shaft adjacent one end thereof, an upwardly extending rearwardly facing hook member rigidly secured on said shaft outwardly of the adjacent lever arm and also on the opposite end of said shaft, a laterally outwardly extending pin element on opposite ends of said door adjacent its lower edge positioned in the path of pivotal movement of said hook members, said hook members upon being pivoted in one direction adapted to lockingly engage said pin elements on said door to maintain said door in a closed position, said actuating means including a rod extending from said lever arm forwardly along said box,
   said coordinating means including a rigid pivotal member on said box remote from said door and having a sleeve rotatably mounted on a shaft secured to said box, an arm integral with said sleeve and extending upwardly and pivotally connected to said rod, a second arm rigidly extending from said sleeve member rearwardly along said frame when said box is lowered on said frame,
   and said coordinating means including an abutment member on said frame positioned in the plane of pivotal movement of said second arm, a spring means anchored to said box between said latch means and said upwardly extending arm and secured to the upper free end of said upwardly extending arm to normally bias said second arm towards engagement with said abutment member and said latch means in the opposite direction from said one direction for disengagement with said door, said second arm engaging said abutment member upon said box being lowered and thereby operating said rod and said latch means for said latch means to engage said door as said door swings closed as said box is lowered to its horizontal position and said door moves to its vertical position, and as said box is raised said second arm is pivoted by said spring and moves away from said abutment member whereby said latch means may pivot out of engagement with said door.

References Cited

UNITED STATES PATENTS

| | | | |
|---|---|---|---|
| 2,009,466 | 7/1935 | Yeager | 298—23 |
| 2,174,956 | 10/1939 | Allison. | |
| 2,342,939 | 2/1944 | Hutchinson | 298—23 |
| 2,552,442 | 5/1951 | McClish | 298—23 |
| 3,072,438 | 1/1963 | Livingston | 298—23 |

FOREIGN PATENTS

| | | |
|---|---|---|
| 842,099 | 7/1960 | Great Britain. |
| 143,979 | 10/1951 | Australia. |

RICHARD J. JOHNSON, *Primary Examiner.*

LEO FRIAGLIA, *Examiner.*